(12) United States Patent
Tanaka et al.

(10) Patent No.: US 6,480,778 B2
(45) Date of Patent: Nov. 12, 2002

(54) DEVICE FOR CHANGING THE SPEEDS OF THE FRONT AND REAR WHEELS IN A FOUR-WHEEL-DRIVE VEHICLE

(75) Inventors: Hirohisa Tanaka, Tokyo (JP); Hidetaka Koga, Kanagawa (JP)

(73) Assignees: Isuzu Motors Limited, Tokyo (JP); Hirosha Tanaka, Tokyo (JP)

( * ) Notice: Subject to any disclaimer, the term of this patent is extended or adjusted under 35 U.S.C. 154(b) by 0 days.

(21) Appl. No.: 09/863,415

(22) Filed: May 24, 2001

(65) Prior Publication Data

US 2001/0047234 A1 Nov. 29, 2001

(30) Foreign Application Priority Data

May 25, 2000 (JP) ........................... 2000-155326

(51) Int. Cl.[7] ................... G06F 17/00; B60K 17/344
(52) U.S. Cl. ................. 701/69; 701/89; 180/233; 180/248
(58) Field of Search .................. 701/69, 89, 90, 701/72; 180/243, 233, 249, 197, 247, 248

(56) References Cited

U.S. PATENT DOCUMENTS

| 4,804,059 A | * | 2/1989 | Sakakiyama | 180/197 |
| 4,825,368 A | * | 4/1989 | Itoh et al. | 180/249 |
| 4,987,967 A | * | 1/1991 | Kouno | 180/233 |
| 5,383,531 A | * | 1/1995 | Yoshioka et al. | 180/233 |

FOREIGN PATENT DOCUMENTS

JP 02290737 A * 11/1990 ........... B60K/23/08

* cited by examiner

Primary Examiner—Jacques H. Louis-Jacques
(74) Attorney, Agent, or Firm—Antonelli, Terry, Stout & Kraus, LLP (57) ABSTRACT

A device for changing the speeds of the front and rear wheels in a four-wheel-drive vehicle including a continuously variable speed-changing mechanism for the front wheels, which changes the input rotational speed and outputs it to the front wheel drive shafts, and a continuously variable speed-changing mechanism for the rear wheels, which changes the input rotational speed and outputs it to the rear wheel drive shafts. The device for changing the speeds of the front wheels and the rear wheels comprises a detector means for detecting the operation conditions of the vehicle, a steering angle sensor for detecting the steering angle of the vehicle, and a controller for variably controlling the speeds of the continuously variable speed-changing mechanisms based on the operation conditions of the vehicle. The controller sets a target speed-changing ratio obtained from the vehicle operating conditions to be a target speed-changing ratio for the rear wheels in the continuously variable speed-changing mechanism for the rear wheels, and sets a speed-changing ratio obtained from the target speed-changing ratio and from a steering angle detected by the steering angle sensor to be a target speed-changing ratio for the front wheels in the continuously variable speed-changing mechanism for the front wheels.

9 Claims, 4 Drawing Sheets

DEVICE FOR CHANGING THE SPEEDS OF THE FRONT AND REAR WHEELS IN A FOUR-WHEEL-DRIVE VEHICLE

FIELD OF THE INVENTION

The present invention relates to a continuously variable speed-changing device and, more specifically, to a device for changing the speeds of the front and rear wheels in a four-wheel-drive vehicle, capable of variably driving the front wheels and the rear wheels independently from each other by using a toroidal type continuously variable speed-changing device.

DESCRIPTION OF THE PRIOR ART

There has heretofore been proposed a four-wheel-drive vehicle equipped with a continuously variable speed-changing mechanism for the front wheels and with a continuously variable speed-changing mechanism for rear wheels in order to variably drive the front wheel drive shafts and the rear wheel drive shafts independently from each other via the continuously variable speed-changing mechanisms, in an attempt to decrease the weight of the four-wheel-drive mechanisms, to avoid the loss of power and to improve the fuel efficiency.

When the four-wheel-drive vehicle turns in accordance with the operation of the steering wheel, there occurs the so-called inside-outside wheel difference that the front wheels turn on the center of rotation with the radii of turn which are on the outer sides of the radii of turn of the rear wheels. The difference in the rotational speed between the front right wheel and the front left wheel is absorbed by a differential for the front wheels provided for the front axles, and the difference in the rotational speed between the rear right wheel and the rear left wheel is absorbed by a differential for the rear wheels provided for the rear axles. When turning, however, the front wheels and the rear wheels travel different distances since the average radius of turn is not the same between the front wheels and the rear wheels. When no countermeasure is taken, like in the four-wheel-drive vehicle of the directly coupled type, therefore, the rotation of the front wheels does not meet the rotation of the rear wheels, giving rise to the occurrence of a so-called tight corner braking phenomenon. The tight-corner braking phenomenon is an undesirable phenomenon impairing smooth turning of the vehicle; i.e., the drive system is greatly twisted due to a difference in the rotation between the front wheels and the rear wheels, the slip and drive of the wheels are repeated making it difficult to smoothly operate the vehicle and, in extreme cases, making it difficult to run the vehicle.

A typical example of the continuously variable speed-changing device in the four-wheel-drive vehicle can be typified by a toroidal type continuously variable speed-changing device disclosed in Japanese Laid-open Patent Publication (Kokai) No. 157151/1993 (JP-A 5-157151). This continuously variable speed-changing device includes an input shaft supported by a casing, and a continuously variable speed-changing mechanism for the front wheels and a continuously variable speed-changing mechanism for the rear wheels that are arranged, spaced apart, in the axial direction of the input shaft. The continuously variable speed-changing mechanism for the front wheels changes the input rotational speed of the input shaft and outputs it to the front wheel drive shafts. The continuously variable speed-changing mechanism for the rear wheels changes the input rotational speed of the input shaft and outputs it to the rear wheel drive shafts. These continuously variable speed-changing mechanisms have been so constituted as to variably drive the front wheels and the rear wheels independently from each other.

The above continuously variable speed-changing mechanism for the front wheels has substantially the same constitution as that of the continuously variable speed-changing mechanism for the rear wheels. Therefore, the constitution of the continuously variable speed-changing mechanism for the front wheels will now be briefly described. The continuously variable speed-changing mechanism for the front wheels includes an input disk which is secured to the input shaft and has one surface in the axial direction thereof formed as an input side recessed surface of an arcuate shape in cross section, and an output disk having one surface in the axial direction thereof formed as an output side recessed surface of an arcuate shape in cross section. The output disk is so disposed as to rotate relative to the input shaft and to surround the outer peripheral surface of the input shaft and has its output side recessed surface disposed so as to be opposed to the input side recessed surface of the input disk in the axial direction. A pair of power rollers are disposed between the input side recessed surface of the input disk and the output side recessed surface of the output disk so as to rotate relative to the input disk and the output disk. The power rollers are supported by trunnions so as to rotate. The axes of rotation of the power rollers are arranged at right angles with the axes of the trunnions that will be described later.

The trunnions are so supported as to rotate about their axes relative to the casing and to move in the axial direction. The axes of the trunnions extend in parallel with each other in the tangential direction relative to the input shaft at symmetrical positions with the input shaft interposed therebetween at an equal distance. On the cross sections of the input disk and of the output disk opposed to each other in the axial direction, the center of arc of the input side recessed surface of the input disk and the center of arc of the output side recessed surface of the output disk are arranged on a common center of arc. Further, the axial centers of the trunnions are arranged to be in agreement with the centers of the corresponding arcs. The axes of the trunnions define tilting axes along which the corresponding power rollers rotate. The power rollers are so constituted as to possess spherically protruded surfaces in the peripheries thereof, the protruded surfaces being brought into a pressed contact (point contact) with the input side recessed surface of the input disk and with the output side recessed surface of the output disk. The trunnions are moved in the axial directions but in the opposite directions relative to each other by the actuators such as hydraulic cylinders, whereby the power rollers rotate about the axes which are tilted by an angle corresponding to the amount of motion of the trunnions and changing of the speed between the input disk and the output disk is performed. According to the toroidal type continuously variable speed-changing device as described above, the rotational forces of the output disks of the continuously variable speed-changing mechanism for the front wheels and of the continuously variable speed-changing mechanism for the rear wheels are output to the front wheels and to the rear wheels independently from each other, to execute the full-time four-wheel drive. Constitutions of trunnions of the toroidal type continuously variable speed-changing device have been disclosed in, for example, Japanese Utility Model Publication (Kokoku) No. 11425/1994 and Japanese Laid-open Patent Publication (Kokai) No. 269039/1997 (JP-A 9-269039).

In the continuously variable speed-changing device, when a steering angle is given to the front wheels, the tilting angle of the power rollers of the continuously variable speed-changing mechanism for the front wheels is differed from the tilting angle of the power rollers of the continuously variable speed-changing mechanism for the rear wheels to drive the four wheels with little loss of power while absorbing the difference in rotational speed between the front wheels and the rear wheels when the vehicle turns, without using the center differential. That is, the tilting angle of the power rollers in the continuously variable speed-changing mechanism for the rear wheels is slightly decreased compared to that of when traveling straight and the tilting angle of the power rollers in the continuously variable speed-changing mechanism for the front wheels is slightly increased compared to that of when traveling straight, so that the rotational speed of the front wheels becomes slightly faster than that of when traveling straight and that the rotational speed of the rear wheels becomes slightly slower than that of traveling straight, thus imparting a difference in the speed between the front wheels and the rear wheels when the vehicle is turning.

In order to cope with the tight corner braking phenomenon that occurs due to a difference in the speed between the front wheels and the rear wheels when a four-wheel-drive vehicle turns, the continuously variable speed-changing device so works that the front wheels run faster than when traveling straight and that the rear wheels run slower than when traveling straight depending upon the steering angle based on a prerequisite that the front wheels and the rear wheels have an equal tire diameter. However, operating the steering wheels at a large steering angle is usually limited to traveling at a low speed. In order to run the rear wheels slower than when traveling straight while the vehicle is turning, therefore, the continuously variable speed-changing mechanism for the rear wheels must have a margin for further tilting the power rollers toward the speed-decreasing side while the vehicle is turning in addition to the range of a maximum tilting angle of the power rollers on the speed-decreasing side of when traveling straight. In order to impart a margin that is not used when traveling straight to the speed-changing range of the continuously variable speed-change mechanism for the rear wheels on the speed-decreasing side, it becomes necessary to further increase a maximum outer diameter of the output disk. An increase in the maximum outer diameter of the output disk means an increase in the weight of the output disk as well as an increase in the force of inertia, affecting the braking performance and driving up the cost. When it is forced to increase the size of the casing with an increase in the size of the output disk, the degree of inconvenience further increases. During the steering operation, further, both the rear wheels and the front wheels must be simultaneously controlled toward the-speed-decreasing side and toward the speed-increasing side with the speed of traveling straight as a reference. Therefore, the control operation becomes complex and may not be stably executed.

SUMMARY OF THE INVENTION

It is an object of the present invention to provide a novel device for changing the speeds of the front and rear wheels in a four-wheel-drive vehicle, which prevents the occurrence of tight-corner braking phenomenon and ensures the smooth turn-traveling at the time of turn-traveling of the vehicle, by a relatively simple control operation without changing the constitution.

Another object of the present invention is to provide a novel device for changing the speeds of the front and rear wheels in a four-wheel-drive vehicle, which prevents the occurrence of tight-corner braking phenomenon when the vehicle turns and enables the vehicle to smoothly turn by independently outputting the rotational forces to the front wheels and to the rear wheels from the output disk of the continuously variable speed-changing mechanism for the front wheels and from the output disk of the continuously variable speed-changing mechanism for the rear wheels, to accomplish the full-time four-wheel drive operation without the need of imparting additional margin that is not used when traveling straight to the speed-change range of the continuously variable speed-changing mechanism for the rear wheels on the speed-decreasing side to allow a relatively simple control operation.

According to the present invention, there is provided a device for changing the speeds of the front and rear wheels in a four-wheel-drive vehicle including a continuously variable speed-changing mechanism for the front wheels, which changes the input rotational speed and outputs it to the front wheel drive shafts, and a continuously variable speed-changing mechanism for the rear wheels, which changes the input rotational speed and outputs it to the rear wheel drive shafts, so that the front wheels and the rear wheels can be driven at continuously variable speeds independently of each other due to the continuously variable speed-changing mechanisms, the device for changing the speeds of the front and rear wheels comprising:

a detector means for detecting the operation conditions of the vehicle;

a steering angle sensor for detecting the steering angle of the vehicle; and a controller for variably controlling the speeds of the continuously variable speed-changing mechanism for the front wheels and the continuously variable speed-changing mechanism for the rear wheels based on the operation conditions of the vehicle detected by the detector means;

the controller setting a target speed-changing ratio obtained from the vehicle operating conditions to be a target speed-changing ratio for the rear wheels in the continuously variable speed-changing mechanism for the rear wheels, and setting a speed-changing ratio obtained from the target speed-changing ratio and from a steering angle detected by the steering angle sensor to be a target speed-changing ratio for the front wheels in the continuously variable speed-changing mechanism for the front wheels.

It is desired that the controller obtains the target speed-changing ratio for the front wheels in compliance with a predetermined equation using the target speed-changing ratio and the steering angle as variables.

It is desired that the controller obtains the target speed-changing ratio for the front wheels from the target speed-changing ratio and the steering angle detected by the steering angle sensor based on a map formed in advance by using, as coordinate axes, the steering angle and the target speed-changing ratio for the front wheels, that corresponds to the steering angle and is determined by the target speed-changing ratio as a reference.

It is desired that the controller obtains the target speed-changing ratio for the front wheels, that corresponds to the steering angle, over a whole range of the target speed-changing ratio, from an approximate equation using the steering angle only as a variable, according to the steering angle detected by the steering angle sensor.

It is desired that the controller obtains the target speed-changing ratio for the front wheels by obtaining a corrected speed-changing ratio for obtaining the target speed-changing ratio for the front wheels, that corresponds to the steering angle detected by the steering angle sensor, in compliance with a predetermined equation, and by adding the corrected speed-changing ratio to the target speed-changing ratio for the rear wheels.

It is desired that the controller obtains the target speed-changing ratio for the front wheels by obtaining a corrected speed-changing ratio corresponding to the steering angle detected by the steering angle sensor based on a map formed in advance by using, as coordinate axes, the steering angle and the corrected speed-changing ratio for obtaining the target speed-changing ratio for the front wheels, that corresponds to the steering angle and is determined by the target speed-changing ratio as a reference, and by adding the corrected speed-changing ratio to the target speed-changing ratio for the rear wheels.

It is desired that the controller obtains the target speed-changing ratio for the front wheels, by obtaining a corrected speed-changing ratio for obtaining the target speed-changing ratio for the front wheels, that corresponds to the steering angle, over a whole range of the target speed-changing ratio, from an approximate equation using the steering angle only as a variable, according to the steering angle detected by the steering angle sensor, and by adding the corrected speed-changing ratio to the target speed-changing ratio for the rear wheels.

It is desired that each of the continuously variable speed-changing mechanism for the front wheels and the continuously variable, speed-changing mechanism for the rear wheels is constituted by a toroidal type continuously variable speed-changing device comprising an input disk for receiving a driving force, an output disk disposed being opposed to the input disk and is drive-coupled to the front wheel drive shafts or to the rear wheel drive shafts, and power rollers disposed between the input disk and the output disk so as to rotate in a tilted manner and change contact points to the input disk and to the output disk to continuously change the rotational speed of the input disk and to transmit the rotation to the output disk.

It is desired that the controller sets a target tilting angle of the power rollers for the front wheels in the continuously variable speed-changing mechanism for the front wheels and a target tilting angle of the power rollers for the rear wheels in the continuously variable speed-changing mechanism for the rear wheels respectively corresponding to the target speed-changing ratio for the front wheels and the target speed-changing ratio for the rear wheels, to control the continuously variable speed-changing mechanism for the front wheels and the continuously variable speed-changing mechanism for the rear wheels based on the target tilting angle for the front wheels and the target tilting angle for the rear wheels.

DESCRIPTION OF THE PREFERRED EMBODIMENTS

Figure 1:
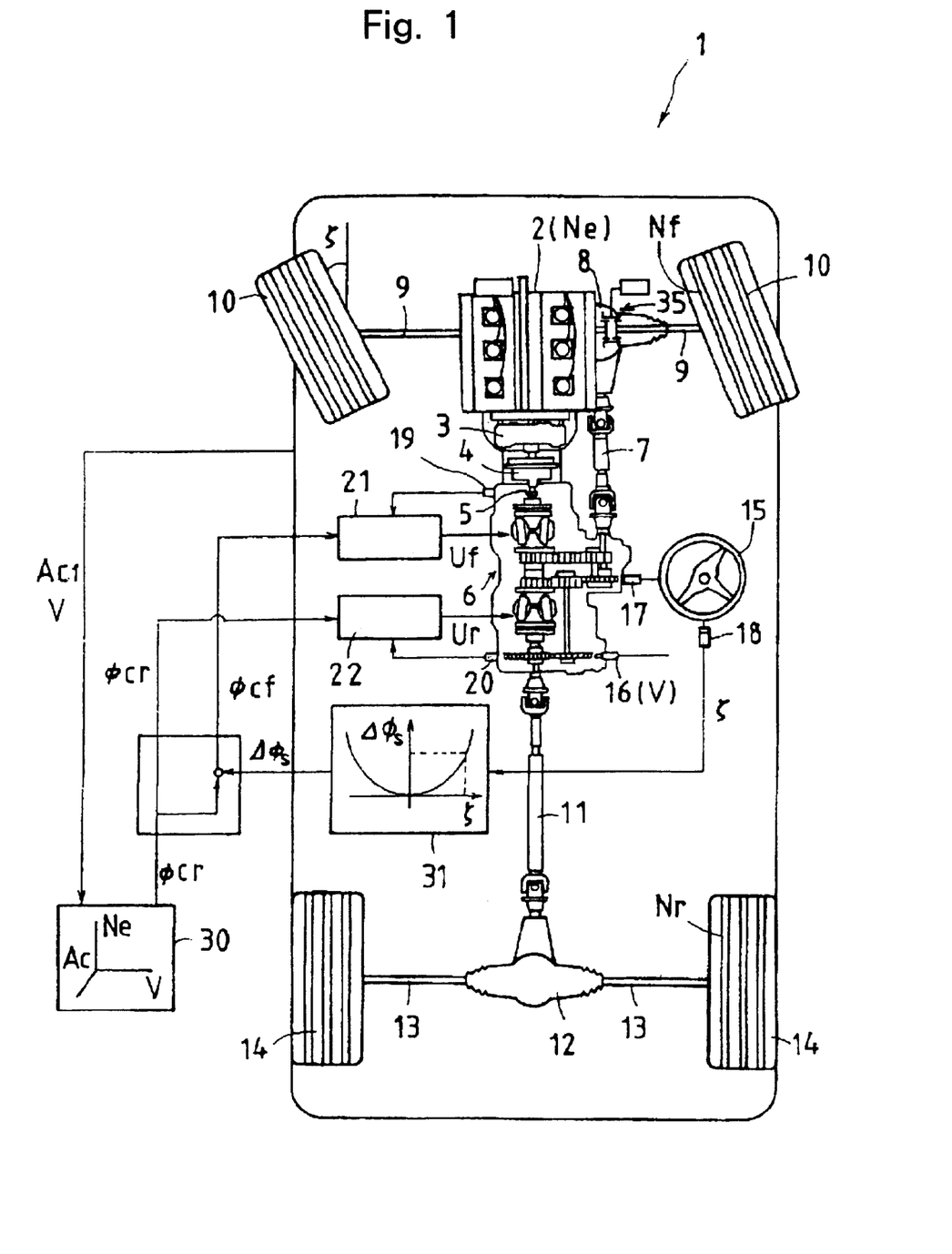
FIG. 1 is a plan view schematically illustrating a four-wheel-drive vehicle equipped with a device for changing the speeds of the front and rear wheels.

Embodiments of the device for changing the speeds of the front and rear wheels in a four-wheel-drive vehicle according to the invention will now be described with reference to the accompanying drawings. Referring to FIG. 1, a four-wheel-drive vehicle 1 equipped with a device for changing the speeds of the front and rear wheels according to the present invention is provided with an engine 2, a torque converter 3 on the output side of the engine, a clutch unit 4 at the back side of the torque converter 3, and a double-cavity toroidal type continuously variable speed-changing device 6 arranged on the main shaft 5 on the output side of the clutch unit 4. The continuously variable speed-changing device 6 will be described later. The clutch unit 4 is constituted by a planetary gear which can be changed to the forward and reverse, and is equipped with a ring gear, a carrier and a clutch capable of being selectively coupled to the casing. Part of the driving force output from the continuously variable speed-changing device 6 is transmitted to a propeller shaft 7 for driving the front wheels, a differential 8 for the front wheels connected to the propeller shaft 7 for driving the front wheels, right and left front wheel drive shafts 9,9 on the output side of the differential 8 for the front wheels and the front wheels 10,10 attached to the front wheel drive shafts 9,9. The remaining driving force output from the continuously variable speed-changing device 6 is transmitted to a propeller shaft 11 for driving the rear wheels, a differential 12 for the rear wheels connected to the propeller shaft 11 for driving the rear wheels, right and left rear wheel drive shafts 13,13 on the output side of the differential 12 for the rear wheels and the rear wheels 14,14 attached to the rear wheel drive shafts 13,13. The front wheels 10,10 are steered as a driver turns a steering wheel 15.

A vehicle speed sensor 16 is disposed on the continuously variable speed-changing device 6 close to a gear on a power transmission passage to the rear wheels 14. The vehicle speed sensor 16 detects the rotational speed of the rear wheels (corresponds to the vehicle speed V). Further, a front wheel rotational speed sensor 17 is disposed on the continuously variable speed-changing device 6 close to a gear on a power transmission passage to the front wheels 10. A detection signal from the front wheel rotational speed sensor 17 is input to a controller 30 for controlling the change of speed of the continuously variable speed-changing device 6. A steering angle sensor 18 for detecting the steering angle of the steering wheel 15 detects the steering angle $\zeta$ of the front wheels 10,10, and sends an output to the controller 30.

The continuously variable speed-changing device 6 is further provided with a tilting angle sensor 19 for the front wheels to detect the true tilting angle $\phi af$ of the power roller 42 for front wheels in the continuously variable speed-changing mechanism 6a for the front wheels that will be described later, and with a tilting angle sensor 20 for rear wheels to detect the true tilting angle $\phi ar$ of the power roller 42 for rear wheels in the continuously variable speed-changing mechanism 6b for the rear wheels that will be described later. In order to control the movement of trunnions 43 of the continuously variable speed-changing mechanism 6a for the front wheels and of the continuously variable speed-changing mechanism 6b for the rear wheels that will be described later, there are arranged a hydraulic servo circuit 21 for the front wheels and a hydraulic servo circuit 22 for the rear wheels for the hydraulic cylinders (not shown) for actuating the trunnions 43 corresponding to the continuously variable speed-changing mechanisms 6a and 6b. As will be described later, the tilting angles of the power rollers 42 are defined according to the moving amounts of the trunnions 43. As will be described later in detail, the target tilting angles of the power rollers 42 in the continuously variable speed-changing mechanisms 6a and 6b correspond to the target speed-changing ratios of the continuously variable speed-changing mechanisms 6a and 6b. A detection signal from the tilting angle sensor 19 for the front wheels is input to the hydraulic servo circuit 21 for the front wheels, and a detection signal from the tilting angle sensor 20 for the rear wheels is input to the hydraulic servo circuit 22 for the rear wheels.

The controller 30 is equipped with a predetermined speed-changing map which comprises the accelerator pedal operation amount Ac such as accelerator pedal-pushing amount of the four-wheel-drive vehicle 1, vehicle speed V and the engine rotational speed Ne. The accelerator pedal operation amount Ac can be detected by, for example, a potentiometer (not shown) that detects the amount of operation of the accelerator pedal. The vehicle speed can be detected by the vehicle speed sensor 16. Further, the engine rotational speed Ne can be detected by detecting the rotational speed of the flywheel of the engine 2 by using, for example, an engine rotational speed sensor that is not shown. These potentiometer, vehicle speed sensor 16 and engine rotational speed sensor constitute detector means for detecting the operation conditions of the vehicle, and detection signals obtained by the detector means are input to the controller 30.

The controller 30 sets a target speed-changing ratio obtained based on the operation conditions of the vehicle detected by the detector means to be a target speed-changing ratio for the rear wheels (corresponds to a target tilting angle $\phi$cr for rear wheels) in the continuously variable speed-changing mechanism 6a for the rear wheels (sends the target speed-changing ratio as a target speed-changing ratio for the rear wheels to the hydraulic servo circuit 22 for the rear wheels), and sets a speed-changing ratio obtained based on the target speed-changing ratio and on the steering angle $\zeta$ detected by the steering angle detector sensor 18 to be a target speed-changing ratio for the front wheels (corresponds to a target tilting angle $\phi$cf for the front wheels) in the continuously variable speed-changing mechanism 6b for the front wheels (sends the speed-changing ratio as a target speed-changing ratio for the front wheels to the hydraulic servo circuit 21 for the front wheels). The hydraulic servo circuits 21 and 22 receive the target tilting angle $\phi$cf for the front wheels and the target tilting angle $\phi$cr for the rear wheels output from the controller 30, receive the true tilting angle $\phi$af for the front wheels detected by the continuously variable speed-changing mechanism 6a for the front wheels and receive the true tilting angle $\phi$ar for the rear wheels detected by the continuously variable speed-changing mechanism 6b for the rear wheels. In response to these input data, control signals Uf and Ur are output to the hydraulic servo circuits 21 and 22, thereby to control the hydraulic pressure of the hydraulic cylinders which are the actuators of the continuously variable speed-changing mechanism 6a and 6b, to control the displacement in the direction of the tilting axis of the trunnions 43 to control the tilted rotation of the power roller 42s, and to control the change of speed in the continuously variable speed-changing mechanisms 6a and 6b. Controlling the tilting angles of the continuously variable speed-changing mechanisms 6a and 6b by the controller 30 will be described later in detail.

In the illustrated embodiment, when the vehicle is turning, the controller 30 sets the target speed-changing ratio to be a target tilting angle $\phi$cr for the rear wheels (corresponds to a target speed-changing ratio for the rear wheels) in the continuously variable speed-changing mechanism 6b for the rear wheels, and sends it as an instruction tilting angle for the rear wheels to the hydraulic servo circuit 22 for the rear wheels. Then, the controller 30 in a correction circuit 31 obtains, based on the steering angle $\zeta$, an amount $\Delta\phi$ (positive value) for correcting the tilting angle as a difference between the target tilting angle $\phi$cr for the rear wheels (corresponds to the target speed-changing ratio for the rear wheels) and the target tilting angle $\phi$cf for the front wheels (corresponding to the target speed-changing ratio for the front wheels) and, further, calculates a target tilting angle $\phi$cf for the front wheels by adding the amount $\Delta\phi$ of correcting the tilting angle to the target tilting angle $\phi$cr for the rear wheels, and sends it as an instruction tilting angle for the front wheels to the hydraulic servo circuit 21 for the front wheels. That is, the target tilting angle $\phi$cf for the front wheels corresponding to the target speed-changing ratio for the front wheels is calculated by adding the amount $\Delta\phi$ for correcting the tilting angle to the target tilting angle $\phi$cr for the rear wheels corresponding to the target speed-changing ratio for the rear wheels. Details will be described later.

Figure 2:
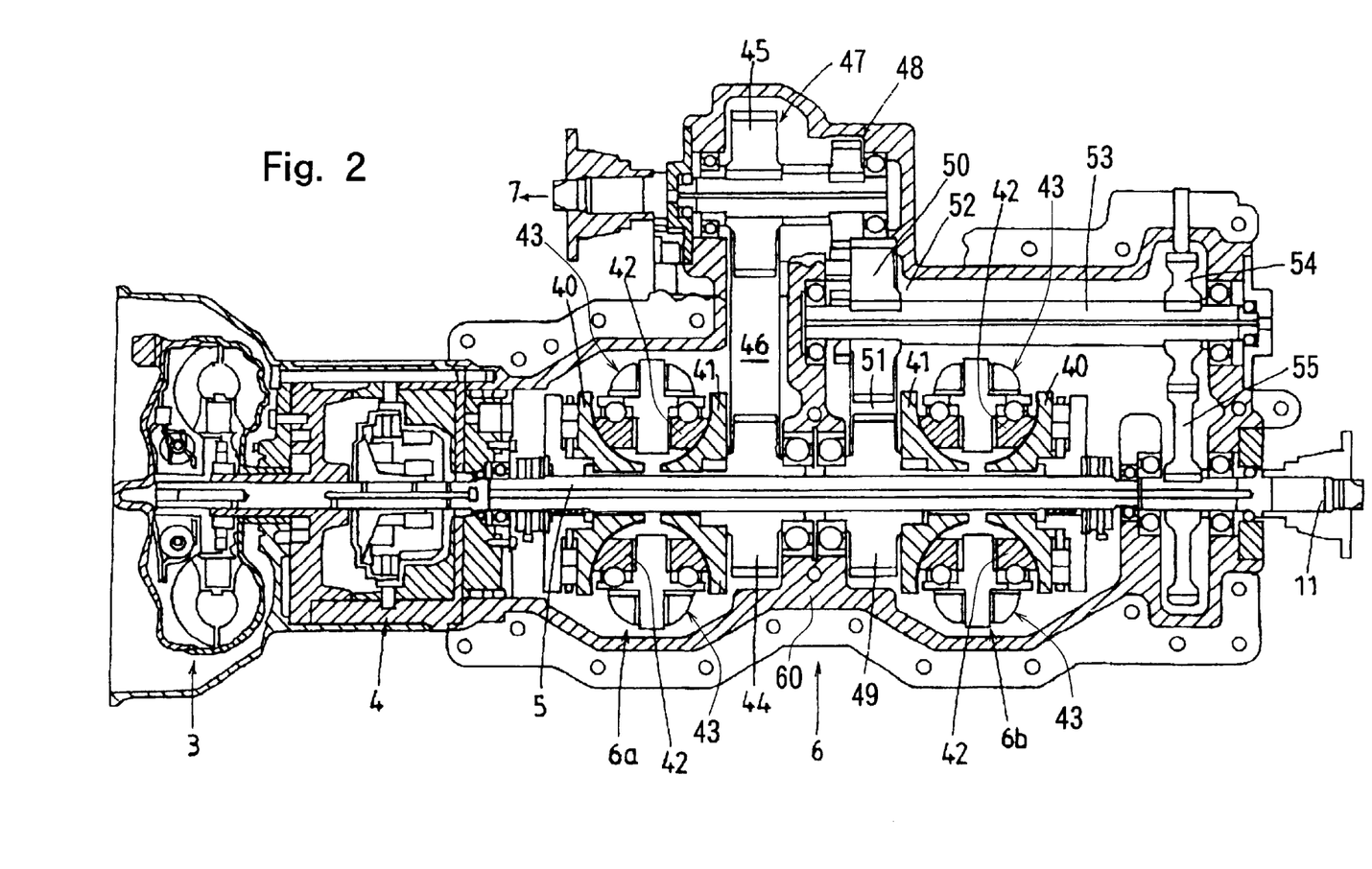
FIG. 2 is a vertical sectional view of the device for changing the speeds of the front and rear wheels of the four-wheel-drive vehicle shown in FIG. 1.

Next, the toroidal type continuously variable speed-changing device 6 will be described with reference to FIG. 2. In FIG. 2, the same constituent elements as those shown in FIG. 1 are denoted by the same reference numerals, and their description is not repeated. Referring to FIG. 2, the continuously variable speed-changing device 6 comprises a main shaft 5 supported by a casing 60, and the continuously variable speed-changing mechanism 6a for the front wheels and the continuously variable speed-changing mechanism 6b for the rear wheels 6b arranged, spaced apart, in the axial direction of the main shaft 5. The output from the engine 2 is input to the main shaft 5 from the torque converter 3 through the clutch unit 4. The continuously variable speed-changing mechanism 6a for the front wheels changes the input rotational speed of the main shaft 5 and outputs it to the front wheel drive shafts 9. Further, the continuously variable speed-changing mechanism 6b for the rear wheels changes the input rotational speed of the main shaft 5 and outputs it to the rear wheel drive shafts 13. The continuously variable speed-changing mechanisms 6a and 6b are controlled by the controller 30 so as to continuously vary the speeds of the front wheels 10,10 and the rear wheels 14,14 independently from each other.

The continuously variable speed-changing mechanism 6a for the front wheels and the continuously variable speed-changing mechanism 6b for the rear wheels are constituted substantially in the same manner. Therefore, the continuously variable speed-changing mechanism 6a for the front wheels will be briefly described. The continuously variable speed-changing mechanism 6a for the front wheels includes an input disk 40 secured to the main shaft 5 and having one surface in the axial direction of the main shaft 5 formed into an input side recessed surface of an arcuate shape in cross section, and an output disk 41 having one surface in the axial direction of the main shaft 5 formed into an output side recessed surface of an arcuate shape in cross section. The output disk 41 is disposed so as to rotate relative to the main shaft 5 and to surround the outer peripheral surface of the main shaft 5, the output side recessed surface thereof being opposed to the input side recessed surface of the input disk 40 in the axial direction. A pair of power rollers 42 are disposed between the input side recessed surface of the input disk 40 and the output side recessed surface of the output disk 41 so as to freely rotate relative to the input disk 40 and the output disk 41. The axes of rotation of the power rollers 42 are disposed to meet at right angles with the axes of the trunnions 43 that will be described later. The power rollers 42 are so constituted as to possess spherical protruded surfaces along the periphery thereof, and the protruded surfaces come in pressed contact (point contact) with the input side recessed surface of the input disk 40 and with the output side recessed surface of the output disk 41.

The power rollers 42 are rotatably supported by the trunnions 43. The trunnions 43 are so supported as to rotate on the axes (axes in agreement with the tilting axis 55 shown in FIG. 4) relative to the casing 60 and to move in the axial direction. The axes of the trunnions 43 extend in parallel with each other in the tangential direction with respect to the main shaft 5 (front-and-back direction in FIG. 2) at symmetrical positions with the main shaft 5 sandwiched therebetween at an equal distance. The center of arc (not shown) of the input side recessed surface of the input disk 40 and the center of arc (not shown) of the output side recessed surface of the output disk 41 are arranged on a common center of arc on the cross section (cross section shown in FIG. 2) of the input disk 40 and the output disk 41 opposed to each other in the axial direction of the main shaft 5. Further, the axes of the trunnions 43 are so arranged as to be in agreement with the centers of the corresponding arcs. Further, the axes of the trunnions 43 define the tilting axis 55 (see FIG. 4) of the corresponding power rollers 42. By moving the trunnions 43 in the axial directions and in the opposite directions by the hydraulic cylinders (not shown) which are the actuators described earlier, the power rollers 42 are tilted on the tilting axis 55 by a tilting angle φ (see FIG. 4) corresponding to the moving amount of the trunnions 43. The contact points are varied between the power rollers 42 and the two disks 40 and 41 according to the tilted rotation of the power rollers 42, whereby the rotational speed of the input disk 40 is continuously varied and is transmitted to the output disk 41 to change the speed between the input disk 40 and the output disk 41. The continuously variable speed-changing device 6 including the thus constituted continuously variable speed-changing mechanism 6a for the front wheels and the continuously variable speed-changing mechanism 6b for the rear wheels, works to output the rotational forces of the output disks 41 of the continuously variable speed-changing mechanism 6a for the front wheels and of the continuously variable speed-changing mechanism 6b for the rear wheels to the front wheels 10,10 and to the rear wheels 14,14 independently from each other, to accomplish the full-time four-wheel drive. As will be obvious from the foregoing description, the continuously variable speed-changing mechanism 6a for the front wheels and the continuously variable speed-changing mechanism 6b for the rear wheels, constitute, single-cavity toroidal type continuously variable speed-changing mechanisms, respectively. Therefore, the continuously variable speed-changing device 6 constitutes a double-cavity toroidal type continuously variable speed-changing device.

In the continuously variable speed-changing mechanism 6a for the front wheels, the rotation of the output disk 41 is transmitted to the front right and left wheels 10,10 from the propeller shaft 7 for the front wheels through a chain transmission device 47 having sprockets 44 and 45 and a chain 46 and through a gear mechanism 48 having an idler gear for bringing the rotational direction into match with the rear wheels 14,14. The front wheel driving force is distributed to the front right and left wheels 10,10 in compliance with the rotational speeds that are different for the inner wheel and for the outer wheel in response to the steering angle ζ of the steering wheel 15 through the differential 8 for the front wheels coupled to the propeller shaft 7 for the front wheels. In the continuously variable speed-changing mechanism 6b for the rear wheels, the rotation of the output disk 41 is transmitted to the propeller shaft 11 for the rear wheels from a chain transmission device 52 having sprockets 49 and 50 and a chain 51 through a gear 54 on a counter shaft 53 and a gear 55 on the propeller shaft 11 for the rear wheels arranged in concentric with the main shaft 5. The rotation of the propeller shaft 11 for the rear wheels is transmitted to the right and left rear wheels 14,14. The rear wheel driving force is distributed to the rear right and left wheels 14,14 in compliance with the rotational speeds that are different for the inner wheel and for the outer wheel through the differential 12 for the rear wheels coupled to the propeller shaft 11 for the rear wheels. The front wheel rotational speed Nf is detected by a front wheel rotational speed sensor 17 provided for a gear mechanism 48 such as a sprocket 45 or an idler on the output side of the chain transmission device 47, and the rear wheel rotational speed Nr is detected by a vehicle speed sensor 16 provided for, for example, the gear 54 on the output side of the counter shaft 53.

Figure 3:
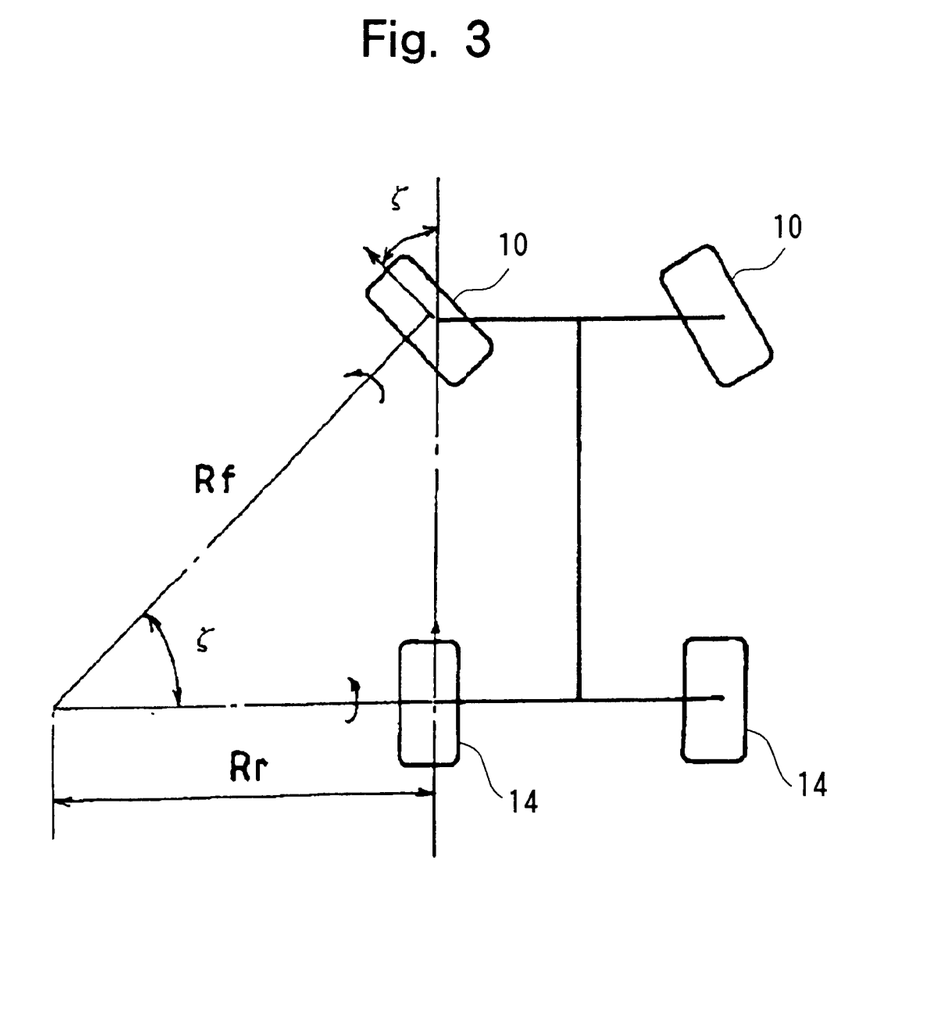
FIG. 3 is a diagram illustrating a geometrical relationship between the steering angle $\zeta$ and the front and rear wheels.

Next, described below with reference to FIG. 3 is a geometrical relationship between the steering angle ζ and the front and rear wheels 10, 14. As will be easily understood from the relationship shown in FIG. 3, there exists a relationship (Ackermann-Jeantaud's theory) expressed by the following equation between the steering angle ζ and the turn radii Rf and Rr of the front and rear wheels 10, 14, $Rf = Rr/\cos \zeta$ As will be easily understood from the above equation, too, since $|\cos \zeta| \leq 1$, the turn radius Rf of the front wheel 10 becomes larger than the turn radius Rr of the rear wheel 14.

If the front and rear wheels 10 and 14 have an equal tire diameter, the rotational speeds Nf, Nr of the front and rear wheels should vary in proportion to the turn radius, so that the rotational speeds of the front and rear wheels 10 and 14 become equal to each other, i.e., $$Nf = Nr/\cos \zeta (\text{i.e.}, Nf/Nr = 1/\cos \zeta) \qquad (2)$$

This relationship is relevant to neither the wheel speed nor to the rotational speed (rpm) of the axle shaft.

Figure 4:
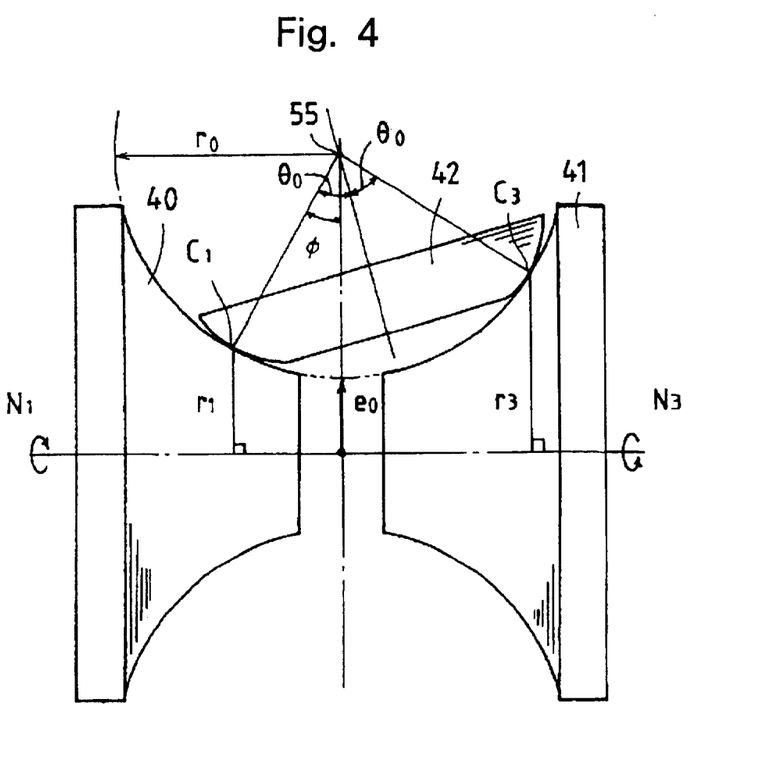
FIG. 4 is a diagram of the constitution of major portions for illustrating a relationship between the tilting angle $\phi$ of the power rollers and the speed-changing ratio in the toroidal type continuously variable speed-changing device.

Described below with reference to FIG. 4 is a relationship between the tilting angle φ of the power rollers 42 and the rotational speed $N_3$ of the output shafts of the toroidal type continuously variable speed-changing mechanisms 6a and 6b. The rotational speeds of the input disk 40 and the output disk 41 are denoted by $N_1$ and $N_3$, the radii (contact radii) at the contact points $C_1$, $C_3$ of the input disk 40, output disk 41 and the power rollers 42 are denoted by $r_1$ and $r_3$, the shortest diameter between the main shaft 5 and the extension of the contact surface between the input disk 40 and the output disk 41 (extension of an arcuate surface of the two disks 40 and 41 shown in cross section in FIG. 4) is denoted be $e_0$, the angle between one contact point $C_1$ and an axially symmetrical surface between the two disks 40 and 41 about the tilting axis 55 of the trunnions 43 (surface that passes through the axial center between the two disks 40 and 41 and through the tilting line 55 and is at right angles with the axes of the two disks 40 and 41 in FIG. 4) is denoted by a tilting angle φ, one-half of an angle viewing the two contact points $C_1$ and $C_3$ is denoted by a half face angle $θ_0$, and a distance from the tilting axis 55 of the trunnions 43 to the contact points C1, C3 of the power rollers 42, i.e., the radius of curvature of the half toroidal is denoted by $r_0$. Then, there holds the following equation from the geometrical relationship, $$r_0 + e_0 = r_0 \cdot \cos\phi + r_1$$
$$= r_0 \cdot \cos(2\theta_0 - \phi) + r_3$$

On the other hand, the ratio of $r_1$ and $r_3$ is inversely proportional to the rotational speed of the input disk 40 and the output disk 41 through the rotation of the power rollers 42 as an intermediary rotation. From the ratio of $r_1$ and $r_3$, the speed-changing ratio e which is a ratio of the rotational speed $N_3$ of the output disk 41 to the rotational speed $N_1$ of the input disk 40, can be obtained in compliance with the following equation (3). Here, in this specification, the speed-changing ratio is a value obtained by dividing the output rotational speed by the input rotational speed.

$$e = N_3/N_1 = r_1/r_3 \qquad (3)$$
$$= (1 + k_0 - \cos\phi)/[(1 + k_0 - \cos(2\theta_0 - \phi)]$$

wherein $k_0$ is a ratio representing a geometrical feature of the half toroidal cavity called cavity aspect ratio ($=e_0/r_0$).

Next, described below is a relationship between the tilting angle φf of the power rollers 42 for the front wheels (hereinafter simply referred to as tilting angle φf) in the continuously variable speed-changing mechanism 6a for the front wheels and the tilting angle φr of the power rollers 42 for the rear wheels (hereinafter simply referred to as tilting angle φr) in the continuously variable speed-changing mechanism 6b for the rear wheels. The rotational speeds of the front wheels 10 and of the rear wheels 14 are denoted by Nf and Nr, and the rotational speeds of the output disks 41 of the continuously variable speed-changing mechanism 6a for the front wheels and of the continuously variable speed-changing mechanism 6b for the rear wheels are denoted by Nf3 and Nr3, respectively. Here, when the reduction ratio of the output disk 14 of the continuously variable speed-changing mechanism 6a for the front wheels to the front wheels 10 is denoted by If, and the reduction ratio of the output disk 14 of the continuously variable speed-changing mechanism 6b for the rear wheels to the rear wheels 10 is denoted by Ir, Nf=$Nf_3$·If and Nr=$Nr_3$·Ir. Usually, the output rotational speeds of the continuously variable speed-changing mechanisms 6a and 6b are set to be reduced at the same reduction ratio as the rotational speeds of the wheels. Therefore, If=Ir and, hence, Nf and Nr are expressed by the following equation, $$Nf/Nr = Nf_3/Nr_3 \qquad (4)$$

The input rotational speeds of the continuously variable speed-changing mechanisms 6a and 6b for the front and rear wheels are the rotational speed of the main shaft 5 and assume the same value. If tilting angles φf and φr of the power rollers 42,42 of the continuously variable speed-changing mechanisms 6a and 6b are used for the equation (3), therefore, the following equations are established, $$Nf_3 = N_1 \cdot (1 + k_0 - \cos\phi f)/[(1 + k_0 - \cos(2\theta_0 - \phi f)]$$

$$Nr_3 = N_1 \cdot (1 + k_0 - \cos\phi r)/[(1 + k_0 - \cos(2\theta_0 - \phi r)]$$

From the ratio of the above two, the following equation holds, $$Nf_3/Nr_3 = 1/\cos\zeta = \{(1 + k_0 - \cos\phi f)/[(1 + k_0 - \cos(2\theta_0 - \phi f)]\}/ \qquad (5)$$
$$\{(1 + k_0 - \cos\phi r)/[(1 + k0 - \cos(2\theta_0 - \phi r)]\}$$

From the equation (5) above, the tilting angle φf of the power rollers 42 for the front wheels in the continuously variable speed-changing mechanism 6a for the front wheels can be expressed by the steering angle ζ and by the tilting angle φr of the power rollers 42 in the continuously variable speed-changing mechanisms 6b for the rear wheels. That is, if the tilting angle φr of the power rollers 42 in the continuously variable speed-changing mechanism 6b for the rear wheels and the steering angle ζ are determined, there can be exclusively determined the tilting angle φf of the power rollers 42 of the continuously variable speed-changing mechanism 6a for the front wheels so will not to develop the tight-corner braking phenomenon. As will be obvious from the foregoing description, the tilting angle φf of the power rollers 42 of the continuously variable speed-changing mechanism 6a for the front wheels corresponds to the speed-changing ratio of the continuously variable speed-changing mechanism 6a for the front wheels, and the tilting angle φr of the power rollers 42 of the continuously variable speed-changing mechanism 6b for the rear wheels corresponds to the speed-changing ratio of the continuously variable speed-changing mechanism 6b for the rear wheels. In other words, the speed-changing ratio of the continuously variable speed-changing mechanism 6a for the front wheels can be replaced by the tilting angle φf of the power rollers 42 of the continuously variable speed-changing mechanism 6a for the front wheels, and the speed-changing ratio of the continuously variable speed-changing mechanism 6b for the rear wheels can be replaced by the tilting angle φr of the power rollers 42 of the continuously variable speed-changing mechanism 6b for the rear wheels. Similarly, the target speed-changing ratio for the front wheels of the continuously variable speed-changing mechanism 6a for the front wheels can be replaced by the target tilting angle φcf of the power rollers 42 for the front wheels in the continuously variable speed-changing mechanism 6a for the front wheels, and the target speed-changing ratio for the rear wheels of the continuously variable speed-changing mechanism 6b for the rear wheels can be replaced by the target tilting angle φcr of the power rollers 42 for the rear wheels in the continuously variable speed-changing mechanism 6b for the rear wheels.

As described earlier, based on the operation conditions of the vehicle detected by the detector means, the controller 30 sets the target speed-changing ratio obtained from the speed-changing map to be the target speed-changing ratio for the rear wheels in the continuously variable speed-changing mechanism 6a for the rear wheels. More specifically, the target tilting angle φcr for the rear wheels corresponding to the target speed-changing ratio is sent, as an instruction tilting angle for the rear wheels, to the hydraulic servo circuit 22 for the rear wheels. The hydraulic servo circuit 22 for the rear wheels further receives the true tilting angle φar for the rear wheels detected by the continuously variable speed-changing mechanism 6b for the rear wheels. In response to these input data, the hydraulic servo circuit 22 for the rear wheels produces a control signal Ur to control the hydraulic pressure of the hydraulic cylinder in the continuously variable speed-changing mechanism 6b for the rear wheels, controls the displacement of the trunnions 43 in the direction of tilting axes in the continuously variable speed-changing mechanism 6b for the rear wheels to control the tilted rotation of the power rollers 42, and brings the tilting angle of the power rollers 42 to the position of target tilting angle φcr for the rear wheels. The rear wheels 14,14 are rotatively driven substantially at the above target speed-changing ratio (=target speed-changing ratio for the rear wheels). The controller 30 further sets the speed-changing ratio obtained based on the target speed-changing ratio and upon the steering angle ζ detected by the steering angle sensor 18 to be the target speed-changing ratio for the front wheels in the continuously variable speed-changing mechanism 6b for the front wheels. More concretely, the target tilting angle φcf for the front wheels corresponding to the speed-changing ratio obtained based on the target tilting angle φcr for the rear wheels corresponding to the target speed-changing ratio and upon the steering angle ζ detected by the steering angle sensor 18, is sent to the hydraulic servo circuit 21 for the front wheels as the instructed tilted angle for the front wheels. The hydraulic servo circuit 21 for the front wheels further receives the true tilting angle φaf for the front wheels detected by the continuously variable speed-changing mechanism 6a for the front wheels. In response to these input data, the hydraulic servo circuit 21 for the front wheels outputs the control signal Uf to control the hydraulic pressure of the hydraulic cylinder in the continuously variable speed-changing mechanism 6a for the front wheels, controls the displacement of the tunnions 43 in the direction of tilting axes in the continuously variable speed-changing mechanism 6a for the front wheels to control the tilted rotation of the power rollers 42, and brings the tilting angle of the power rollers 42 to the position of the target tilting angle φcf for the front wheels. The front wheels 10,10 are rotated substantially at the target speed-changing ratio for the front wheels. As will be obvious from the foregoing description, the front wheels 10,10 are driven at a speed substantially larger than the rear wheels 14,14 to meet the steering angle ζ.

According to the device for changing the speeds of the front and rear wheels in a four-wheel drive vehicle of the present invention as will be obvious from the foregoing description, the target speed-changing ratio for the front wheels that is on the speed-increasing side is obtained based on the target speed-changing ratio for the rear wheels and upon the steering angle ζ from the target speed-changing ratio for the rear wheels as a reference. It is, therefore, allowed to prevent the occurrence of tight-corner braking phenomenon when the vehicle turns relying on a relatively simple control operation without changing the constitution and, hence, to smoothly turn the vehicle. In the conventional device described earlier, the control operation is executed for imparting a speed differential to the front wheels and to the rear wheels when the vehicle is turning. For this purpose, a margin that is not used for traveling straight must be added to the range in which the speed is changed of the continuously variable speed-changing mechanism 6b for the rear wheels on the speed-decreasing side, making it necessary to further increase the maximum outer diameter of the output disk 41. In the present invention, however, there is no need to add a margin that is not used for traveling straight to the speed-decreasing side in the range of changing the speed in the continuously variable speed-changing mechanism 6b for the rear wheels and, hence, there is no need of further increasing the maximum outer diameter of the output disk 41 of the continuously variable speed-changing mechanism 6b for the rear wheels. According to the present invention, as a result, the weight of the output disk does not increase, the force of inertia does not increase, the weight can be decreased, the braking performance needs not be enhanced, and an increase in the cost is avoided. Further, the casing needs not be formed in an increased size, and the continuously variable speed-changing mechanism 6 is constructed in a compact size. According to the conventional device, on the other hand, when the vehicle turns, both the front wheels and the rear wheels must be simultaneously controlled toward the speed-decreasing side and toward the speed-increasing side on a basis of the speed of traveling straight as a reference. Therefore, the control operation is complex and there is a possibility of being not stably controlled. According to the present invention, on the other hand, the target speed-changing ratio for the front wheels which is on the speed-increasing side is obtained based on the target speed-changing ratio and the steering angle ζ on a basis of the target speed-changing ratio for the rear wheels as a reference. Therefore, the control operation is simple and is stably carried out.

The controller 30 obtains the target speed-changing ratio for the front wheels in compliance with a predetermined equation by using the target speed-changing ratio (=target speed-changing ratio for the rear wheels which corresponds to the target tilting angle φcr for the rear wheels) and the steering angle ζ as variables. Specifically, the above-mentioned equation (5) is stored in the controller 30 and is used to calculate the target speed-changing ratio for the front wheels (corresponding to the target tilting angle φcf for the front wheels). That is, the target speed-changing ratio for the front wheels in the continuously variable speed-changing mechanism 6a for the front wheels, which does not develop the tight-corner braking phenomenon, can be theoretically obtained according to the equation (5) in response to the target speed-changing ratio obtained based on the operation conditions of the vehicle and the steering angle ζ detected by the steering angle sensor 18. It is therefore allowed to accurately and easily control the variable speed-changing of the front wheels in response to the operation conditions of the vehicle and the steering angle ζ.

The controller 30 obtains the corrected speed-changing ratio Δφ corresponding to the steering angle ζ detected by the steering angle sensor 18, based on a map prepared in advance by using, as coordinate axes, the steering angle ζ and the corrected speed-changing ratio (corresponds to the amount Δφ for correcting the tilting angle) for obtaining the target speed-changing ratio for the front wheels (corresponds to the target tilting angle φcf for the front wheels), that corresponds to the steering angle ζ and is determined by the target speed-changing ratio (=target speed-changing ratio for the rear wheels which corresponds to the target tilting angle φcr for the rear wheels) as a reference. The controller 30, then, adds the above corrected speed-changing ratio Δφ to the target speed-changing ratio (corresponds to the target tilting angle φcr for the rear wheels) to obtain the target speed-changing ratio for the front wheels. More specifically, the controller 30 stores the map prepared in advance by using, as coordinate axes, the steering angle ζ and the amount Δφ for correcting the tilting angle for obtaining the target tilting angle φcf of the power rollers 42 for the front wheels in the continuously variable speed-changing mechanism 6a for the front wheels corresponding to the steering angle ζ on a basis of the target tilting angle φcr of the power rollers 42 for the rear wheels in the continuously variable speed-changing mechanism 6b for the rear wheels as a reference. Then, the amount Δφ for correcting the tilting angle is obtained based on the steering angle ζ detected by the steering angle sensor 18, and is added to the target tilting angle φcr of the power rollers 42 for the rear wheels in the continuously variable speed-changing mechanism 6b for the rear wheels, whereby the target tilting angle φcf the power rollers 42 for the front wheels in the continuously variable speed-changing mechanism 6a for the front wheels can be calculated.

Figure 5:
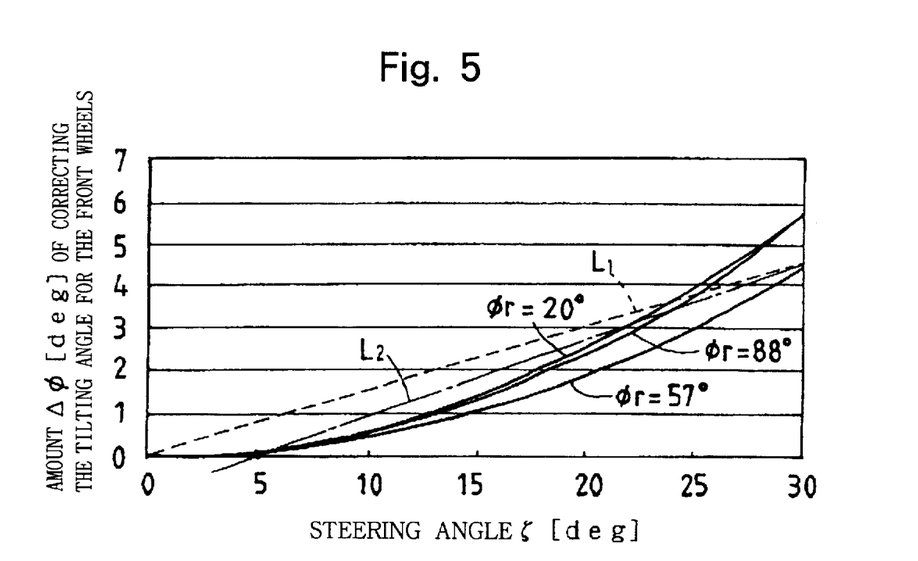
FIG. 5 is a graph illustrating a relationship between the steering angle $\zeta$ and the amount $\Delta\phi$ of correcting the tilting angle in the device for changing the speeds of the front and rear wheels of the four-wheel-drive vehicle according to the invention.

For example, FIG. 5 is a graph illustrating relationships between the steering angle ζ and the amount Δφ for correcting the tilting angle on a basis of the tilting angle φr for the rear wheels as a reference, when $k_0=0.45$ and $θ_0=57°$ (these values become constant when the toroidal type continuously variable speed-changing device to be mounted is determined) as geometrical characteristics of the cavities of the toroidal type continuously variable speed-changing device 6. That is, the graph of FIG. 5 shows the relationships between the steering angle ζ and the amount Δφ of correcting the tilting angle in three cases of when φr=20° (corresponds to the case of the low gear with the speed-changing ratio e=0.336), when φr=57° (corresponds to the case of the directly coupled state with the speed-changing ratio e=1.00) and when φr=88° (corresponds to the case of the high gear with the speed-changing ratio e=2.57) with the tilting angle φr for the rear wheels as a parameter. The graph of FIG. 5 further shows the relationships between the steering angle ζ and the amount Δφ for correcting the tilting angle for the above values of the target tilting angle φr for the rear wheels. When the steering angle ζ is brought to the opposite side, the graph becomes symmetrical with respect to the vertical axis of the steering angle ζ=0 as shown in the correction circuit 31 in FIG. 1. The tilting angle φr for the rear wheels in FIG. 5 can be replaced by the target tilting angle φcr for the rear wheels (=target speed-changing ratio which corresponds to the target speed-changing ratio for the rear wheels).

As will be easily understood from FIG. 5, the amount Δφ for correcting the tilting angle, generally, assumes the smallest value at the directly coupled position φr=57° and tends to increase toward either the speed-increasing side or the speed-decreasing side from the directly coupled position. The amount Δφ for correcting the tilting angle lies within a narrow range even under a state where the speed is most decreased or under a state where the speed is most increased. In short, even a linear approximation connecting the origin to a point where the amount Δφ for correcting the tilting angle becomes 4.5° at a maximum steering angle (ζ=30°) lies within a range of elastic deformation of the tires. Therefore, the tight-corner braking phenomenon is apparently small and the traveling of the vehicle is not hindered. The amount Δφ for correcting the tilting angle may be operated by the controller 30 in compliance with the equation (5) as a matter of course. As shown in FIG. 5, further, the amount Δφ for correcting the tilting angle lies within a relatively narrow range corresponding to the steering angle ζ, over the whole range of the tilting angle φr for the rear wheels. Accordingly, the amount Δφ for correcting the tilting angle can be approximated by a straight line (a linear equation that is an approximate equation) as represented by $L_1$ [Δφ=(4.5/30)×ζ] or $L_2$ [Δφ=(4.5/(30−5))×(ζ−5)] in FIG. 5. Further, the amount Δφ for correcting the tilting angle can be represented by a suitable polygonal line that is folded at a steering angle ζ of 5° or 10°, or by an approximate curve or an approximate equation such as a secondary curve that passes through between the directly coupled position φr=57° and the most speed-decreased side φr=20°. These approximate equations can be expressed using the steering angle ζ only as a variable, and permit the calculation to be conducted very easily. Good results of changing the speed of the front wheels are obtained even by using the amount Δφ of correcting the tilting angle obtained by the approximate equation or by the approximate values using maps, and are practicably useful.

According to the present invention as will be obvious from the foregoing description, the controller 30 obtains the corrected speed-changing ratio corresponding to the steering angle ζ detected by the steering angle sensor 18, based on the map prepared in advance by using, as coordinate axes, the steering angle ζ and the corrected speed-changing ratio (corresponding to the amount Δφ of correcting the tilting angle) for obtaining the target speed-changing ratio for the front wheels (corresponding to the target tilting angle φcf for the front wheels), that corresponds to the steering angle ζ and is determined by the target speed-changing ratio (=target speed-changing ratio for the rear wheels and corresponding to the target tilting angle φcr for the rear wheels) as a reference. The controller 30, then, adds the corrected speed-changing ratio to the target speed-changing ratio for the rear wheels, in order to obtain the target speed-changing ratio for the front wheels. That is, the controller 30 easily obtains the target speed-changing ratio for the front wheels in the continuously variable speed-changing mechanism 6a for the front wheels so will not to cause the tight-corner braking phenomenon, based on the target speed-changing ratio which the controller 30 has obtained and on the steering angle ζ detected by the steering angle sensor 18. The correction for obtaining the target speed-changing ratio for the front wheels is accomplished by adding the corrected speed-changing ratio obtained based on the target speed-changing ratio and on the steering angle ζ to the target speed-changing ratio for the rear wheels. Therefore, the speed-changing ratio is simply operated by the controller, the operation time is short, and the CPU and the memory need bear a decreased amount of burden.

According to the present invention, further, the controller 30 obtains the corrected speed-changing ratio for obtaining the target speed-changing ratio for the front wheels, that corresponds to the steering angle ζ, over the whole range of the target speed-changing ratio, from the approximate equation using the steering angle ζ only as the variable, according to the steering angle ζ detected by the steering angle sensor 18. The controller 30 then adds the corrected speed-changing ratio to the target speed-changing ratio for the rear wheels to obtain the target speed-changing ratio for the front wheels. That is, the controller 30 obtains the target speed-changing ratio for the front wheels by the approximate equation using the steering angle ζ only as a variable, over the whole range of the target speed-changing ratio. The approximate equation is obtained based on the graph (see FIG. 5) prepared in advance by using, as coordinate axes, the steering angle ζ and the corrected speed-changing ratio for obtaining the target speed-changing ratio for the front wheels, that corresponds to the steering angle ζ, over the whole range of the target speed-changing ratio. As can be easily understood from FIG. 5, the amount of correcting the ratio of the target speed-changing ratio for the front wheels obtained according to the equation (5) to the target speed-changing ratio for the rear wheels, lies within a narrow range for all target speed-changing ratios and for all steering angles ζ. Therefore, the amount of correcting the speed-changing ratio can be approximated by using a simple approximate function such as a primary function or a secondary function using the steering angle ζ only as a variable. The speed can be favorably changed for the front and rear wheels even by correcting the target speed-changing ratio based on the target speed-changing ratio for the front wheels obtained by the operation by using the approximated function. According to the present invention, the target speed-changing ratio for the front wheels in the continuously variable speed-changing mechanism 6a for the front wheels, which does not cause tight-corner braking phenomenon, can be obtained by a simple interpolation such as linear interpolation. Therefore, the control operation is simple, stable, and is practicably useful. The controller 30 is, of course, capable of obtaining the corrected speed-changing ratio based on the map drawing an approximate line corresponding to the approximate equation, and obtaining the target speed-changing ratio for the front wheels by adding the corrected speed-changing ratio to the target speed-changing ratio for the rear wheels.

According to the present invention, further, the controller 30 obtains the corrected speed-changing ratio for obtaining the target speed-changing ratio for the front wheels, that corresponds to the steering angle $\zeta$ detected by the steering angle sensor 18, in compliance with the predetermined equation, and adds the corrected speed-changing ratio to the target speed-changing ratio for the rear wheels thereby to obtain the target speed-changing ratio for the front wheels. This equation is prepared based on the equation (5), and the corrected speed-changing ratio may be obtained as a difference between the target speed-changing ratio for the rear wheels and the target speed-changing ratio for the front wheels.

According to the present invention, further, the controller 30 can obtain the target speed-changing ratio for the front wheels from the target speed-changing ratio and the steering angle $\zeta$ detected by the steering angle sensor 18, based on a map prepared in advance by using, as coordinate axes, the steering angle $\zeta$ and the target speed-changing ratio for the front wheels, that corresponds the steering angle $\zeta$ and is determined by the target speed-changing ratio for the rear wheels as a reference. The map can be easily formed based on the equation (5) by replacing the amount $\Delta\phi$ of correcting the tilting angle by the target speed-changing ratio for the front wheels (target tilting angle $\phi cf$ for the front wheels) in FIG. 5. According to the present invention, the target speed-changing ratio for the front wheels can be directly obtained based on the target speed-changing ratio and the steering angle $\zeta$ detected by the steering angle sensor 18.

According to the present invention, further, the controller 30 can obtain the target speed-changing ratio for the front wheels, that corresponds to the steering angle $\zeta$, over the whole range of the target speed-changing ratio, from the approximate equation using the steering angle $\zeta$ only as a variable, according to the steering angle $\zeta$ detected by the steering angle sensor 18. The approximate equation can be obtained by using a graph prepared in advance by using, as coordinate axes, the steering angle $\zeta$ and the target speed-changing ratio for the front wheels, that corresponds to the steering angle $\zeta$, over the whole range of the target speed-changing ratio. This graph can be easily formed based on the equation (5) by replacing the amount $\Delta\phi$ of correcting the tilting angle by the target speed-changing ratio for the front wheels (target tilting angle $\phi cf$ for the front wheels) in FIG. 5. The above approximate equation can be obtained in substantially the same manner as that of obtaining the corrected speed-changing ratio (corresponds to the amount $\Delta\phi$ of correcting the tilting angle). According to the present invention, the target speed-changing ratio for the front wheels can be directly obtained by the approximate equation based on the steering angle $\zeta$ detected by the steering angle sensor 18. The controller 30 is, of course, capable of obtaining the target speed-changing ratio for the front wheels by using a map describing an approximate curve corresponding to the approximate equation.

According to the present invention, further, the continuously variable speed-changing mechanism 6a for the front wheels and the continuously variable speed-changing mechanism 6b for the rear wheels are, respectively, constituted by a toroidal type continuously variable speed-changing device 6 comprising an input disk 40 which receives the driving force, an output disk 41 that is arranged opposite to the input disk 40 and is drive-coupled to the front wheel drive shafts 9,9 or to the rear wheel drive shafts 13,13, and power rollers 42 arranged between the input disk 40 and the output disk 41 so as to rotate in a tilted manner and to continuously change the rotational speed of the input disk 40 and transmit it to the output disk 41 by changing the contact points to the input disk 40 and to the output disk 41. The thus constituted toroidal type continuously variable speed-changing device 6 is capable of transmitting a large torque compared with the belt-type continuously variable speed-changing device and is, further, capable of quickly changing the speed, contributing to easily changing the speed by the controller 30.

According to the present invention, further, the controller 30 sets the target tilting angle $\phi cf$ of the power rollers 42 for the front wheels in the continuously variable speed-changing mechanism 6a for the front wheels and the target tilting angle $\phi cr$ of the power rollers 42 for the rear wheels in the continuously variable seed-changing mechanism 6b for the rear wheels, correspondingly to the target speed-changing ratio for the front wheels and to the target speed-changing ratio for the rear wheels. The controller 30 then controls the continuously variable speed-changing mechanism 6a for the front wheels and the continuously variable speed-changing mechanism 6b for the rear wheels, based on the target tilting angle $\phi cf$ for the front wheels and on the target tilting angle $\phi cr$ for the rear wheels. Upon executing a relatively simple control operation, therefore, the controller 30 prevents the occurrence of the tight-corner braking phenomenon when the vehicle turns, and enables the vehicle to turn smoothly.

In the toroidal type continuously variable speed-changing device 6, the power rollers 42 are rotatably supported by the trunnions 43 which can be moved in the directions of tilted axes by the actuators. The controller 30 controls the operation of the actuators in the continuously variable speed-changing mechanism 6a for the front wheels and in the continuously variable speed-changing mechanism 6b for the rear wheels, based on a deviation between the target speed-changing ratio for the front wheels or the target speed-changing ratio for the rear wheels and the true speed-changing ratio for the front wheels or the true speed-changing ratio for the rear wheels calculated based on the rotation of the output disk 41, in order to control the tilting angle of the power rollers 42 by feedback. Due to this control operation, occurrence of the tight-corner braking phenomenon is reliably prevented when the vehicle turns, and the vehicle is allowed to turn smoothly.

In response to the target speed-changing ratio for the front wheels and the target speed-changing ratio for the rear wheels, the controller 30 sets the target tilting angle $\phi cf$ of the power rollers 42 for the front wheels in the continuously variable speed-changing mechanism 6a for the front wheels or the target tilting angle $\phi cr$ of the power rollers 42 for the rear wheels in the continuously variable speed-changing mechanism 6b for the rear wheels, respectively, and further controls the continuously variable speed-changing mechanism 6a for the front wheels and the continuously variable speed-changing mechanism 6b for the rear wheels based on the target tilting angle φcf for the front wheels and the target tilting angle φcr for the rear wheels. When the tilting angle is to be controlled by feedback, the operation of the actuator is controlled based on the deviation between the target tilting angle and the actually detected tilting angle so that the deviation is canceled. Due to this control operation, occurrence of the tight-corner braking phenomenon is reliably prevented when the vehicle turns, and the vehicle is allowed to turn smoothly.

What we claim is:

1. A device for changing the speeds of the front and rear wheels in a four-wheel-drive vehicle including a continuously variable speed-changing mechanism for the front wheels, which changes the input rotational speed and outputs it to the front wheel drive shafts, and a continuously variable speed-changing mechanism for the rear wheels, which changes the input rotational speed and outputs it to the rear wheel drive shafts, so that the front wheels and the rear wheels can be driven at continuously variable speeds independently of each other due to the continuously variable speed-changing mechanisms, said device for changing the speeds of the front and rear wheels comprising:

a detector means for detecting the operation conditions of the vehicle;

a steering angle sensor for detecting the steering angle of the vehicle; and a controller for variably controlling the speeds of said continuously variable speed-changing mechanism for the front wheels and said continuously variable speed-changing mechanism for the rear wheels based on the operation conditions of the vehicle detected by said detector means;

said controller setting a target speed-changing ratio obtained from the vehicle operating conditions to be a target speed-changing ratio for the rear wheels in the continuously variable speed-changing mechanism for the rear wheels, and setting a speed-changing ratio obtained from said target speed-changing ratio and from a steering angle detected by said steering angle sensor to be a target speed-changing ratio for the front wheels in the continuously variable speed-changing mechanism for the front wheels.

2. A device for changing the speeds of the front and rear wheels in a four-wheel-drive vehicle according to claim 1, wherein said controller obtains the target speed-changing ratio for the front wheels in compliance with a predetermined equation using said target speed-changing ratio and the steering angle as variables.

3. A device for changing the speeds of the front and rear wheels in a four-wheel-drive vehicle according to claim 1, wherein said controller obtains the target speed-changing ratio for the front wheels from said target speed-changing ratio and the steering angle detected by the steering angle sensor, based on a map formed in advance by using, as coordinate axes, the steering angle and the target speed-changing ratio for the front wheels, that corresponds to the steering angle and is determined by said target speed-changing ratio as a reference.

4. A device for changing the speeds of the front and rear wheels in a four-wheel-drive vehicle according to claim 1, wherein said controller obtains the target speed-changing ratio for the front wheels, that corresponds to the steering angle, over a whole range of the target speed-changing ratio, from an approximate equation using the steering angle only as a variable, according to the steering angle detected by the steering angle sensor.

5. A device for changing the speeds of the front and rear wheels in a four-wheel-drive vehicle according to claim 1, wherein said controller obtains the target speed-changing ratio for the front wheels by obtaining a corrected speed-changing ratio for obtaining the target speed-changing ratio for the front wheels, that corresponds to the steering angle detected by the steering angle sensor, in compliance with a predetermined equation, and by adding the corrected speed-changing ratio to the target speed-changing ratio for the rear wheels.

6. A device for changing the speeds of the front and rear wheels in a four-wheel-drive vehicle according to claim 1, wherein said controller obtains the target speed-changing ratio for the front wheels by obtaining a corrected speed-changing ratio corresponding to the steering angle detected by the steering angle sensor based on a map formed in advance by using, as coordinate axes, the steering angle and the corrected speed-changing ratio for obtaining the target speed-changing ratio for the front wheels, that corresponds to the steering angle and is determined by the target speed-changing ratio as a reference, and by adding the corrected speed-changing ratio to the target speed-changing ratio for the rear wheels.

7. A device for changing the speeds of the front and rear wheels in a four-wheel-drive vehicle according to claim 1, wherein said controller obtains the target speed-changing ratio for the front wheels by obtaining a corrected speed-changing ratio for obtaining the target speed-changing ratio for the front wheels, that corresponds to the steering angle, over a whole range of the target speed-changing ratio, from an approximate equation using the steering angle only as a variable, according to the steering angle detected by the steering angle sensor, and by adding the corrected speed-changing ratio to the target speed-changing ratio for the rear wheels.

8. A device for changing the speeds of the front and rear wheels in a four-wheel-drive vehicle according to claim 1, wherein each of the continuously variable speed-changing mechanism for the front wheels and the continuously variable speed-changing mechanism for the rear wheels is constituted by a toroidal type continuously variable speed-changing device comprising an input disk for receiving a driving force, an output disk that is disposed being opposed to the input disk and is drive-coupled to the front wheel drive shafts or to the rear wheel drive shafts, and power rollers disposed between the input disk and the output disk so as to rotate in a tilted manner and to change contact points to the input disk and to the output disk to continuously change the rotational speed of the input disk and to transmit the rotation to the output disk.

9. A device for changing the speeds of the front and rear wheels in a four-wheel-drive vehicle according to claim 8, wherein said controller sets a target tilting angle of the power rollers for the front wheels in the continuously variable speed-changing mechanism for the front wheels and a target tilting angle of the power rollers for the rear wheels in the continuously variable speed-changing mechanism for the rear wheels, respectively, correspondingly to the target speed-changing ratio for the front wheels and the target speed-changing ratio for the rear wheels, to control the continuously variable speed-changing mechanism for the front wheels and the continuously variable speed-changing mechanism for the rear wheels based on the target tilting angle for the front wheels and the target tilting angle for the rear wheels.

* * * * *